United States Patent
Pniewski

(10) Patent No.: US 10,125,840 B2
(45) Date of Patent: Nov. 13, 2018

(54) AIR SPRING HYBRID PISTON ASSEMBLY

(71) Applicant: Continental Automotive Systems, Inc., Auburn Hills, MI (US)

(72) Inventor: Garrett M. Pniewski, Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 158 days.

(21) Appl. No.: 14/516,801

(22) Filed: Oct. 17, 2014

(65) Prior Publication Data

US 2016/0108985 A1    Apr. 21, 2016

(51) Int. Cl.
| | |
|---|---|
| *F16F 9/05* | (2006.01) |
| *B60G 11/27* | (2006.01) |
| *B60G 15/14* | (2006.01) |
| *F16F 9/084* | (2006.01) |

(52) U.S. Cl.
CPC .............. *F16F 9/057* (2013.01); *B60G 11/27* (2013.01); *B60G 15/14* (2013.01); *F16F 9/084* (2013.01); *B60G 2202/152* (2013.01); *B60G 2202/314* (2013.01); *B60G 2204/1262* (2013.01); *B60G 2204/45021* (2013.01); *B60G 2206/82* (2013.01); *F16F 2224/02* (2013.01)

(58) Field of Classification Search
CPC .. F16F 9/057; F16F 9/084; F16F 9/092; F16F 2224/02
See application file for complete search history.

(56) References Cited

U.S. PATENT DOCUMENTS

| | | | | |
|---|---|---|---|---|
| 4,555,096 | A | | 11/1985 | Pryor |
| 4,712,776 | A | * | 12/1987 | Geno ..................... B60G 15/14 188/322.12 |
| 4,802,657 | A | * | 2/1989 | Wijnhoven ...... B60G 17/01933 188/1.11 E |
| 5,009,401 | A | * | 4/1991 | Weitzenhof ............ B60G 15/14 188/321.11 |
| 5,135,203 | A | * | 8/1992 | Wijnhoven ............. F16F 9/084 267/64.21 |
| 5,636,831 | A | * | 6/1997 | Gubitz ...................... F16F 9/05 267/220 |
| 8,474,798 | B2 | | 7/2013 | Jeischik |
| 2006/0207847 | A1 | * | 9/2006 | Kojima .................. B60G 15/14 188/322.12 |

(Continued)

FOREIGN PATENT DOCUMENTS

| | | |
|---|---|---|
| DE | 19753637 A1 | 6/1998 |
| DE | 102006036248 A1 | 2/2008 |

(Continued)

OTHER PUBLICATIONS 15187821.2 European Patent Office Search Report dated Mar. 8, 2016.

(Continued)

*Primary Examiner* — Bradley T King

(57) ABSTRACT

An air spring includes a damper, a support ring associated with a portion of the damper, and a piston assembly. The piston assembly includes a first piston member press-fitted to the damper, and a second piston member fitted with the first piston member. The second piston member is supported by the support ring. The two-piece piston assembly allows for a large package for volume at low cost.

8 Claims, 2 Drawing Sheets

(56) References Cited

U.S. PATENT DOCUMENTS

| | | | |
|---|---|---|---|
| 2008/0006974 A1* | 1/2008 | Stahmer | F16F 9/05 |
| | | | 267/64.11 |
| 2010/0320657 A1 | 12/2010 | Chapman | |
| 2015/0035213 A1* | 2/2015 | Stahmer | F16F 9/057 |
| | | | 267/64.27 |

FOREIGN PATENT DOCUMENTS

| | | |
|---|---|---|
| EP | 0318696 A2 | 6/1989 |
| EP | 1327539 A2 | 7/2003 |
| EP | 1693233 A1 | 8/2006 |
| JP | S60-009712 | 1/1985 |
| JP | H03-244844 A | 10/1991 |
| JP | H10-086621 A | 4/1998 |
| JP | H03-096444 A | 9/2003 |
| JP | 2005-180615 A | 7/2005 |
| JP | H09-250587 B2 | 7/2005 |
| JP | 2006-234070 A | 9/2006 |
| WO | WO 2007104671 A1 * | 9/2007 ............. B60G 11/27 |
| WO | 2014029543 A1 | 2/2014 |
| WO | 2006/048085 A1 | 5/2016 |

OTHER PUBLICATIONS

English translation of Office Action in Japan Application No. 2015-204448 dated Oct. 31, 2016.

* cited by examiner

AIR SPRING HYBRID PISTON ASSEMBLY

FIELD

This invention relates to a pneumatic spring or air spring for a vehicle and, in particular, to a two-part piston assembly of an air spring.

BACKGROUND

A conventional air spring is a device that is arranged between a vehicle body and chassis. The typical air spring has at least one working space that is filled with compressed air, wherein at least one working space is, in each case, delimited at least partially by movable walls in the form of roll-type or fold-type bellow. The working spaces are connected to one another via flow ducts, and the flow ducts have throttle valves.

FIG. 1 shows a portion of a conventional air spring, generally indicated at 10, for a motor vehicle. The air spring 10 has a working chamber 12 filled with compressed air that is at least partially delimited by rolling bellow 14, which forms a rolled fold 14a. When the vehicle experiences spring compression and spring extension, the rolling bellow 14 rolls both on a rotationally symmetrical contour of a roll-off piston 16 and on the inner surface of a guide tube 18. At its ends 20, 22, the rolling bellow 14 is fastened to the connecting parts by clamping rings 24, 26. The air spring 10 has a centrally arranged hydraulic damper including a piston rod 28 connected via and by the air spring cover (not shown) to the bodywork. The piston rod 28 is connected to a damper 30 that is connected, via a connecting flange (not shown) to a wheel support of the chassis in the conventional manner.

The piston 16 is a one-piece standing piston that stands on a support ring 32, which is supported by a damper snap ring 34. These lower cost parts are typically made of plastic material and the piston does not provide a large volume for the air spring. The piston 16 is also difficult to package.

Another type of air spring piston is a hanging piston (not shown). This type of piston is pressed onto the damper and is typically made of roll formed aluminum. This piston offers larger packages for volume, but is very expensive.

Thus, there is a need to provide a standing piston for an air spring that allows for large volume for an air spring at low cost.

SUMMARY

An objective of the invention is to fulfill the need referred to above. In accordance with the principles of an embodiment, this objective is achieved by an air spring that includes a damper, a support ring associated with a portion of the damper, and a piston assembly. The piston assembly includes a first piston member press-fitted to the damper, and a second piston member fitted with the first piston member. The second piston member is supported by the support ring. The two-piece piston assembly allows for a large package for volume at low cost.

In accordance with another aspect of an embodiment, a piston assembly is provided for an air spring having a damper. The piston assembly includes a first piston member constructed and arranged to be press-fitted to the damper, and a second piston member fitted with the first piston member, the second piston member being constructed and arranged to be supported by the damper.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 2:
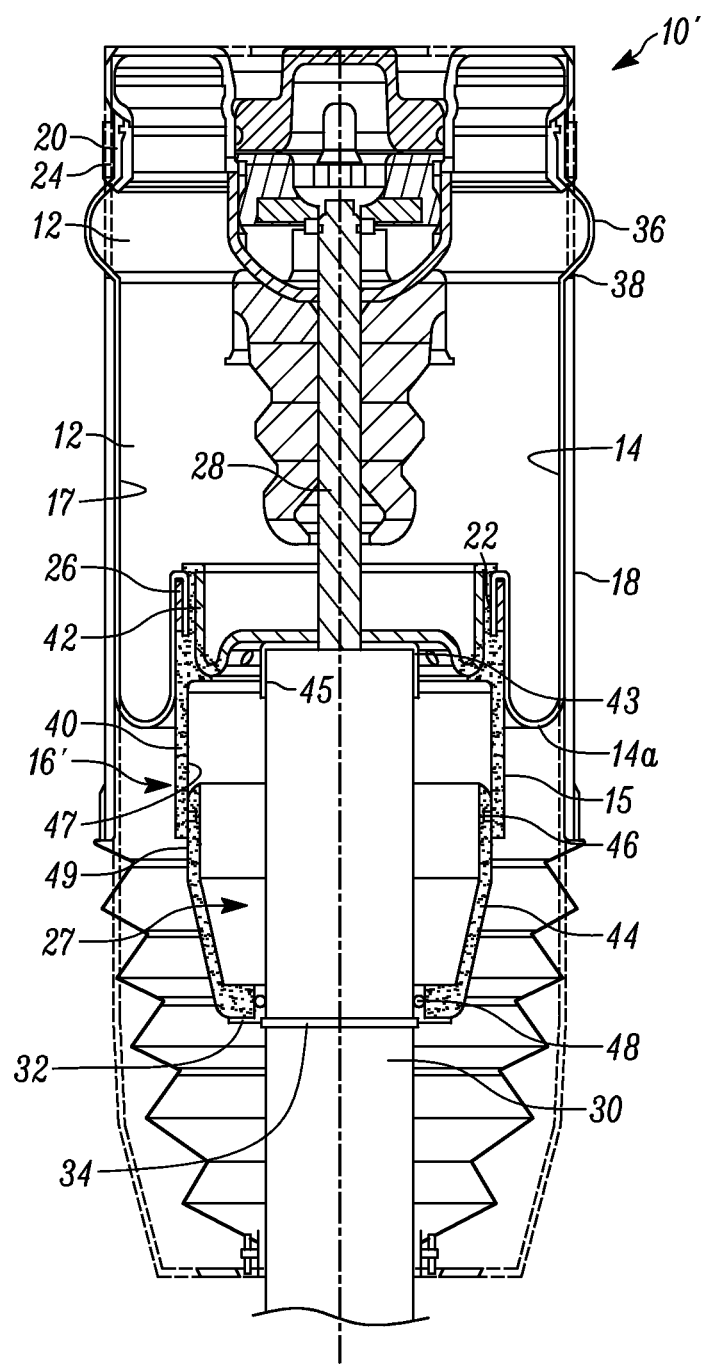
FIG. 2 is a view of an air spring having a two piece standing piston in accordance with an embodiment.

With reference to FIG. 2, a portion of an air spring is shown, generally indicated at 10', for a motor vehicle. The air spring 10' can be of the type disclosed in U.S. Pat. No. 8,474,798, the content of which is hereby incorporated by reference into this specification. Thus, the air spring 10' has at least one working chamber 12 filled with compressed air, which is at least partially delimited by an elastomer rolling bellow 14 that forms a rolled fold 14a. When the vehicle experiences spring compression and spring extension, the rolling bellow 14 rolls both on a rotationally symmetrical outer surface 15 of a roll-off piston assembly, generally indicated at 16', and on an inner surface 17 of a metal guide tube 18. Thus, the guide tube 18 surrounds a portion of the rolling bellow 14. At its ends 20, 22, the rolling bellow 14 is fastened to the connecting parts by clamping rings 24, 26. The air spring 10' has a centrally arranged hydraulic damper structure, generally indicated at 27, including a piston rod 28 preferably connected via an air spring cover (not shown) to the bodywork. The piston rod 28 is connected to a damper 30 that is connected, via a connecting flange (not shown) to a wheel support of the chassis in the conventional manner. The conventional cardanic fold 36 of the bellow 14 is adjacent to an end 38 of the guide tube 18.

In accordance with the embodiment, the piston assembly 16' comprises an upper or first piston member 40 that includes a striker cap 42 that has a press-fit connection 43 with an end 45 of the damper 30. The first piston member 40 is preferably plastic and thus over-molds the metal striker cap 42. Alternatively, the upper piston 40 can be composed of metal such as aluminum or steel or a combination thereof. The piston assembly 16' also includes a plastic lower or second member 44 that is supported by (e.g., stands on) a support ring 32 that is supported by the damper snap ring 34. Alternatively, the upper piston 40 can be composed of plastic overmolding the striker cap 42, with the lower piston being composed of metal such as aluminum or steel or a combination thereof. The damper snap ring 34 is coupled to the periphery of the damper 30. Thus, the piston assembly 16' is of the standing type. The upper piston member 40 is generally cylindrical having an interior 47 that receives a portion of the generally cylindrical periphery 49 of the lower piston member 44. An O-ring 46 provides a seal between the upper piston member 40 and the lower piston member 44. Instead of providing O-ring 46, the upper and lower piston members can be welded together. Another O-ring 48 provides a seal between damper 30 and the lower piston member 44.

Figure 1:
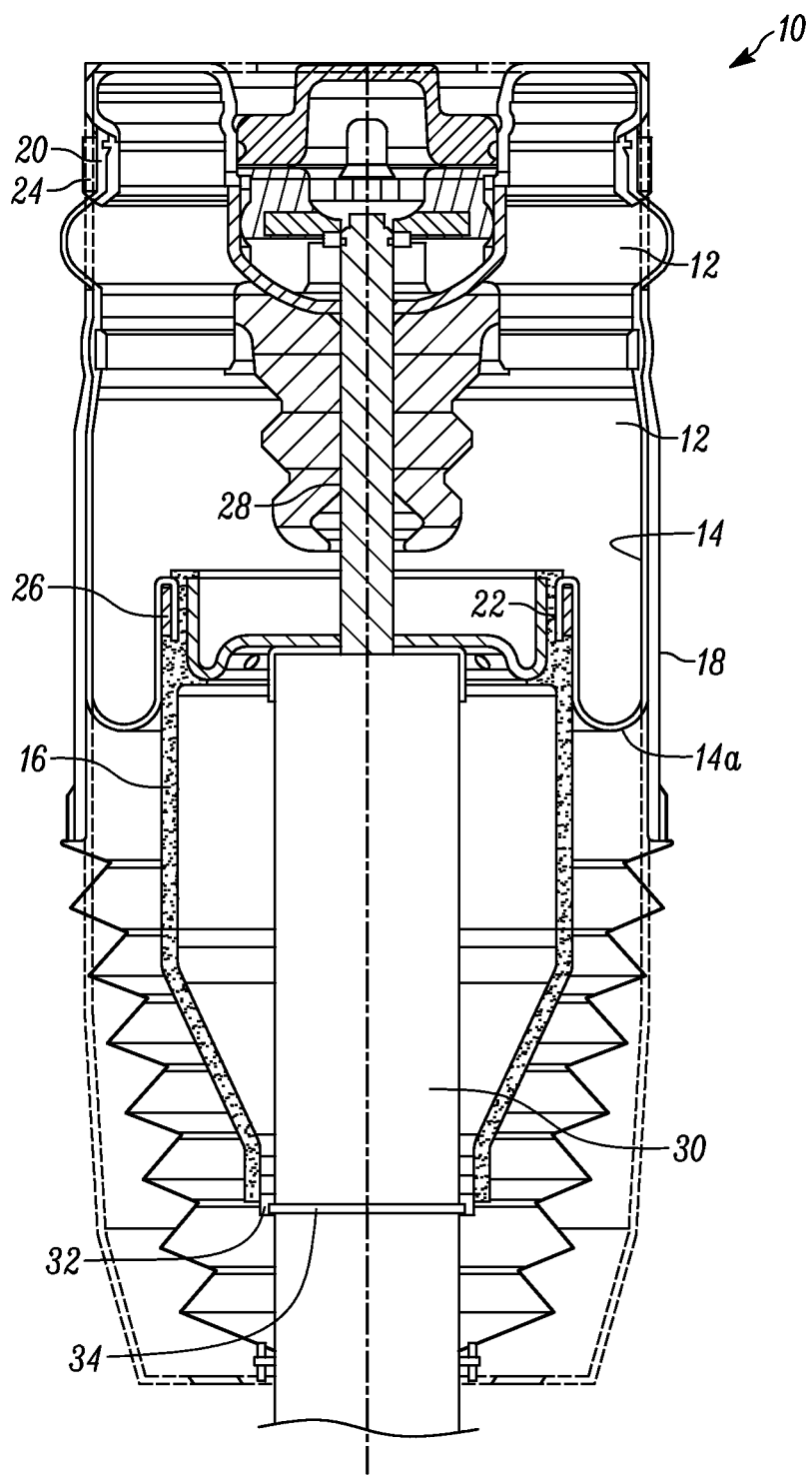
FIG. 1 is a view of a conventional air spring having a single piece standing piston.

Thus, the piston assembly 16' uses two retaining features, a press-fit connection 43 over the damper 30 at the upper piston member 40, and the lower piston member 44 stands on the support 32 so that both the upper piston member 40 and the lower piston member 44 are held by the damper 30. The piston assembly 16' advantageously allows for larger package for volume as compared to the conventional single piston of FIG. 1, with such volume package being comparable to the conventional aluminum hanging piston, without the additional cost of the aluminum hanging piston and the manufacturing costs associated therewith. Furthermore, the piston assembly 16' can replace existing hanging pistons in current production applications by simply adding a support ring.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An air spring comprising:
   a damper,
   a support ring associated with a portion of the damper, and
   a piston assembly comprising:
      a first piston member press-fitted to the damper, and
      a second piston member having an outer diameter portion received in an interior volume of the first piston member such that a portion of the damper extends in the interior volume of the first piston member and an interior volume of the second piston member so that the damper is in spaced relation with respect to an internal wall of each of the first and second piston members, the second piston member being supported by the support ring,
   an O-ring providing a seal between the first piston member and the second piston member,
   a bellow at least partially delimiting at least one working chamber that is constructed and arranged to be filled with compressed air, and
   a guide tube surrounding at least a portion of the bellow,
   wherein the bellow is constructed and arranged to roll with respect to both an outer surface of the first piston member and an inner surface of the guide tube.

2. The air spring of claim 1, wherein the first piston member is generally cylindrical defining the interior that receives the portion of the second piston member, the portion of the second piston member being a generally cylindrical periphery of the second piston member, and the second piston member being coupled with the first piston member.

3. The air spring of claim 1, further comprising a damper snap ring coupled to a periphery of the damper, the damper snap ring supporting the support ring.

4. The air spring of claim 1, wherein the first piston member and the second piston member are each composed of plastic.

5. The air spring of claim 4, wherein the first piston member includes metal cap that is press-fitted with an end of the damper.

6. The air spring of claim 5, wherein the cap is overmolded by the first piston member.

7. The air spring of claim 1, wherein the first piston member is composed of plastic and the second piston member is composed of metal.

8. The air spring of claim 1, wherein the first piston member is composed of metal and the second piston member is composed of plastic.

* * * * *